United States Patent

[11] 3,593,574

| [72] | Inventor | Ray E. Omholt |
| | | Berwyn, Pa. |
| [21] | Appl. No. | 850,953 |
| [22] | Filed | Aug. 18, 1969 |
| [45] | Patented | July 20, 1971 |
| [73] | Assignee | Powerlock Floors, Inc. |
| | | Philadelphia, Pa. |

[54] TESTING APPARATUS
5 Claims, 8 Drawing Figs.

[52] U.S. Cl. .................................................. 73/95, 73/101
[51] Int. Cl. ...................................................... G01n 3/08, G01n 3/24, G01n 3/28
[50] Field of Search ........................................ 73/100, 101, 95, 103, 88

[56] References Cited
UNITED STATES PATENTS

| 1,819,232 | 8/1931 | Cropper .................... | 73/94 |
| 2,469,346 | 5/1949 | Watter ...................... | 73/100 |
| 2,677,271 | 5/1954 | Faris et al. ................ | 73/100 |
| 2,835,128 | 5/1958 | Herrstrum ................. | 73/141 |
| 2,924,969 | 2/1960 | Clough et al. ............. | 73/101 |

FOREIGN PATENTS

| 240,077 | 5/1965 | Austria ....................... | 42 K/5 |
| 1,018,726 | 2/1966 | Great Britain ............... | 601/n |

OTHER REFERENCES

Adams "Tensile Machine" J. SCI. INSTRUMENTS Vol. 36 Oct 1959. pg. 444

TIMBER Desch-MacMillan & Co. London 1947. plates 32 & 33 pg. 75

TEXTBOOK OF WOOD TECHNOLOGY Brown et al. McGraw-Hill N.Y. 1952 pp. 438, 439, 441

Primary Examiner—Richard C. Queisser
Assistant Examiner—John Whalen
Attorney—Zachary T. Wobensmith, 2ND

ABSTRACT: A portable testing tool is provided for testing flooring system components such as holddown clips to determine the holddown strength of the clip, the clip load at which the board fails, the strength of the tongues, the flexibility of the board, and other characteristics, and for these purposes has a frame with parallel force applying walls, a force applying unit adapted for reading of the applied force and holding elements for specific force application to clips, to the tongues of boards and to boards.

PATENTED JUL20 1971 3,593,574

INVENTOR
RAY E. OMHOLT
BY
ATTORNEY

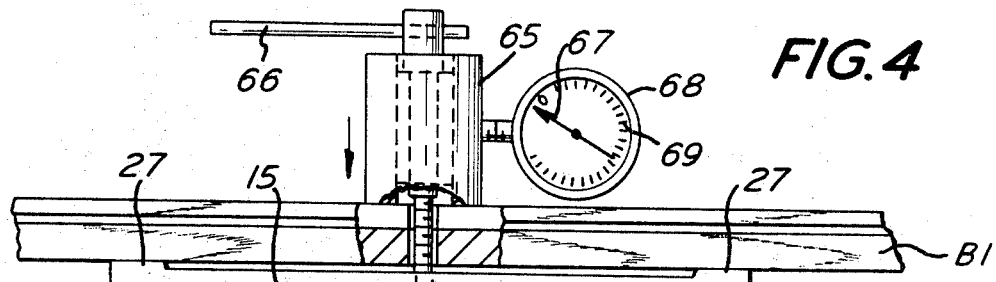
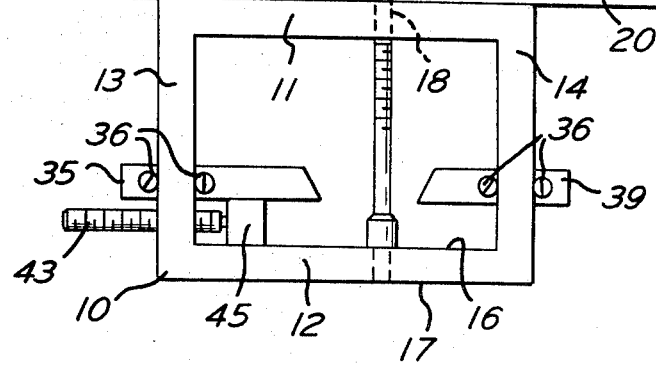
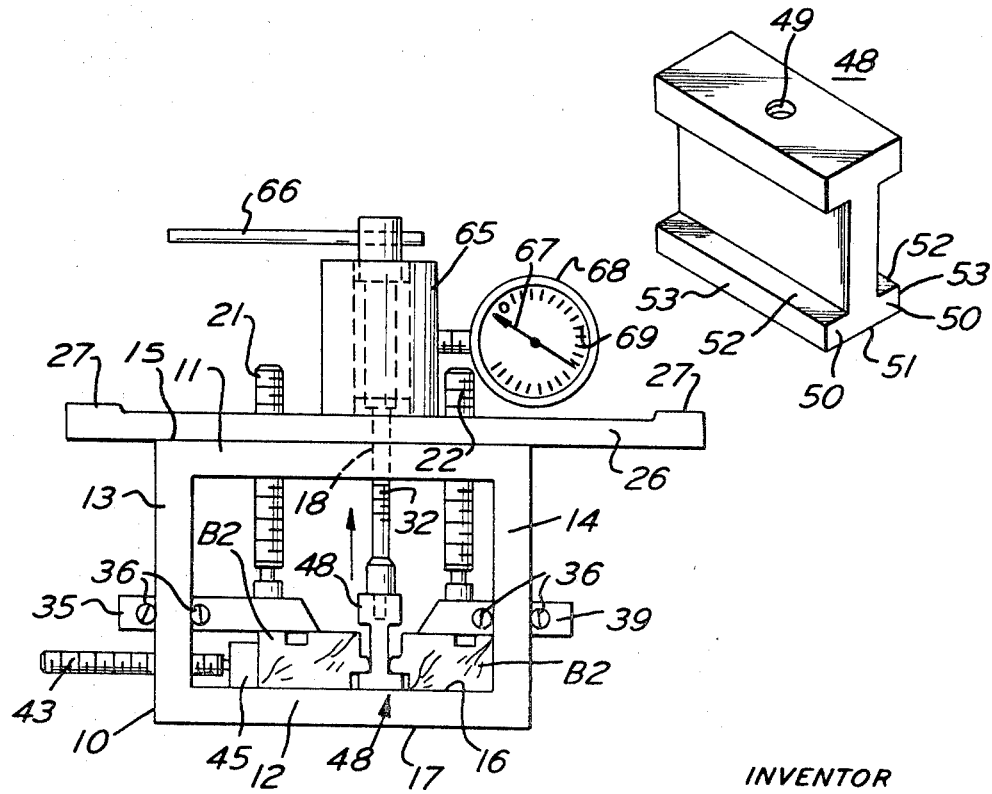
FIG. 4
FIG. 5
FIG. 6
INVENTOR
RAY E. OMHOLT
BY
ATTORNEY

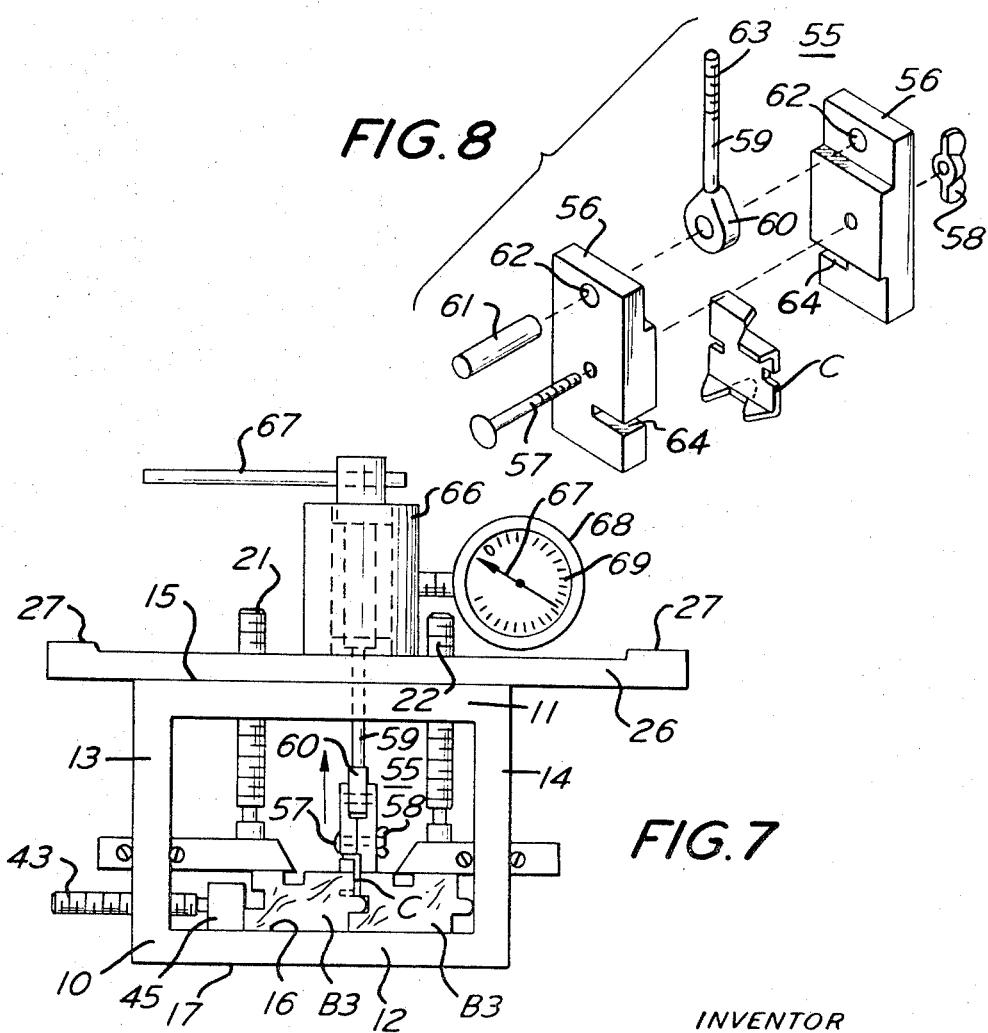

TESTING APPARATUS

BACKGROUND OF THE INVENTION

1. Field of the Invention

This invention relates to testing tools for determining in a unitary and portable assembly the effect of force application on components of flooring systems, such as hold down clips and floor boards.

2. Description of the Prior Art

Testing machines are well known for testing tension, compression and bending but no portable testing tool has heretofore been available with which tests could be quickly and easily made at any direct location of wood-flooring system components.

SUMMARY OF THE INVENTION

In accordance with the invention a testing tool is provided for testing components and particularly those of channel-type flooring systems, and including floor boards and holddown clips, the tool having a frame with parallel force applying elements, a force applying unit and holding elements for direct force application as desired.

It is the principal object of the present invention to provide a testing tool for testing force application to components of channel-type flooring systems which is simple in construction, which can be readily set up for a preferred type of test and quickly set up for a different preferred type of test, and which is reliable in its action.

It is a further object of the present invention to provide a testing tool of the character aforesaid which, by reason of its portability, can be used for purposes of demonstration, and for comparison of competitive structures.

It is a further object of the present invention to provide a testing tool for testing force application to components of channel-type flooring systems and which can be operated by relatively unskilled persons.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 4 is a view in elevation of the tool as shown in FIG. 1 set up for one type of test with a specimen and the force applying unit in place, and with parts not employed for the test removed;

FIG. 5 is a view similar to FIG. 4 showing the tool of the present invention set up for another type of test;

FIG. 6 is a view of a force applying attachment used in the set up of FIG. 5;

FIG. 7 is a view similar to FIG. 5 showing the tool of the present invention set up for another type of test; and FIG. 8 is an exploded perspective view of a force applying attachment used in the set up of FIG. 7.

It should, of course be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENTS

Channel-type flooring systems have been extensively used, such systems comprising spaced parallel channels secured to a foundation or base, with parallel wooden floor boards transversely disposed with respect to the channels and held with respect thereto by clips which engage in horizontal longitudinal grooves in the side edges of the floor boards and engage with the channels. Illustration of such systems will be found in U.S. Pat. Nos. 3,031,725 and 3,271,916. Such clips have also been applied to tongued and grooved boards as in U.S. Pat. No. 3,267,630.

Figure 1:
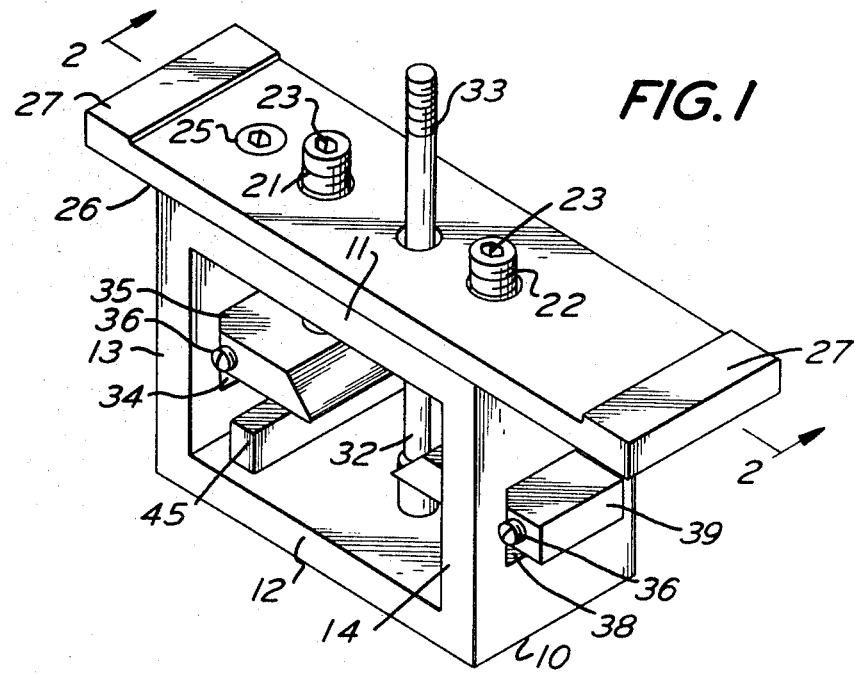
FIG. 1 is a view in perspective of the testing tool of the present invention as it is packed for shipping and with the specimen to be tested and the force applying unit removed.
Figure 2:
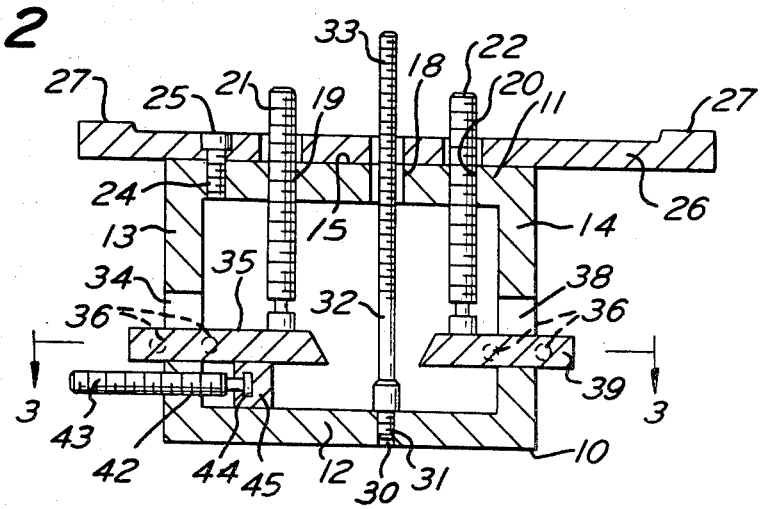
FIG. 2 is a vertical sectional view taken approximately on the line 2-2 of FIG. 1.
Figure 3:
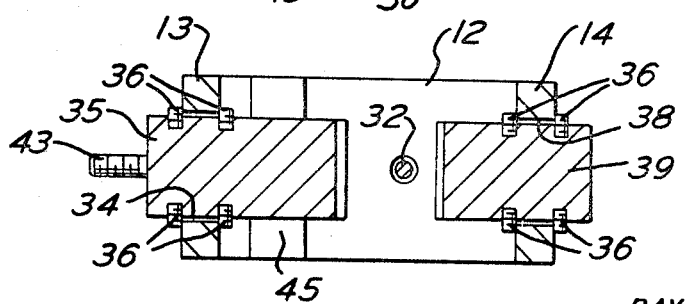
FIG. 3 is a horizontal sectional view taken approximately on the line 3-3 of FIG. 1.

Referring now more particularly to FIGS. 1 to 4 of the drawings, the testing tool therein illustrated includes a frame 10 having a horizontal top wall 11, a horizontal bottom wall 12, and vertical sidewalls 13 and 14 connecting the walls 11 and 12 and providing an open side box. The walls 11, 12, 13 and 14 are of metal and of sufficient thickness to be rigid upon the application of force thereto.

The top wall 11 has an exposed working face 15 and the bottom wall 12 has an inner working face 16 and an outer face 17 which serves as a supporting face for the tool and which can be placed on a desk, table or work bench as desired.

The top wall 11 has an access opening 18 therethrough, threaded openings 19 and 20 for the removable mounting of vertically disposed adjustable holding screws 21 and 22. The screws 21 and 22 have hexagonal sockets 23 for the reception of a hexagonal wrench (not shown).

The top wall 11 has a threaded opening 24 for engagement by a clamp screw 25 which holds a rigid metallic support plate 26 in position on the top wall 11. The screw 25 has a hexagonal socket for the reception of a hexagonal wrench.

The support plate 26 has opposite flat parallel ribs 28 for the support of a board to be tested as hereinafter explained.

The bottom wall 12 has a threaded opening 30 for the reception of the threaded end 31 of a force transfer rod 32. The rod 32 has a threaded end 33 and extends through the opening 18 for certain tests, whether engaging in the opening 30 or attached to some object other than the wall 12.

The sidewall 13 has a vertical slot 34 for the reception of a holding or abutment arm 35. The arm 35 is permitted to move vertically in the slot 34 but is held against removal by screw pins 36 on each side.

The sidewall 14 has a vertical slot 38, similar to the slot 34, for the reception of a holding or abutment arm 39. The arm 39 is permitted to move vertically in the slot 38 but is held against removal by screw pins 36 on each side.

The sidewall 13 has a threaded opening 42 for the reception of an adjusting screw 43 which has a head 44 for positioning a horizontally removable abutment bar 45.

Referring now to FIGS. 5 and 6 a tongue force applying element 48 is there shown which comprises a blade H-shaped in cross section with a threaded opening 49 for engagement by the threaded end 31 of the force transfer rod 32.

The tongue force applying element 48, on each side thereof, has a rib 50 having a vertical dimension from its outer horizontal bottom face 51 to the parallel horizontal faces 52 which is substantially equal to and does not exceed the dimension on a floor board to be tested from the top face thereof to the top of the tongue, this distance on a floor board being referred to as the wearing depth.

The ribs 50 have horizontal dimensions equal to or slightly greater than the horizontal width of the tongue of the floor board so that the side edge faces 53 can engage the longitudinal side edges of the floor boards to be tested above the tongues.

Referring now to FIGS. 7 and 8 the force applying holding element 55 for testing clips and their action is shown and includes a pair of clip engaging blocks 56 held together by a bolt 57 and wing nut 58, and with a force transfer rod 59 having a ring 60 for engagement by a pin 61 carried on openings 62 in the blocks 56. The rod 59 has a threaded end 63.

The blocks 56 are provided with openings 64 for engagement with a clip C which has an exposed portion corresponding to that normally disposed within the channel when in use for engagement with floor boards in a well-known manner.

A force applying unit 65 of well-known type is provided actuated by a wrench 66. The unit has a liquid fill which, dependent upon the force applied, actuates the pointer 67 of a fluid pressure gage 68. The dial 69 of the gage 68 is preferably calibrated to give readings in pounds. For purposes of the present invention the area in the unit 65 on which the force is applied is a unit area, say one square inch, so that readings are available both in pounds and in pounds per square inch.

Referring again to FIGS. 1, 2 and 3, if it is desired to prepare the tool for tests as in FIG. 4 the holding screws 21 and 22 can be removed. A piece of floor board B1 of sufficient length has a hole 72 drilled therethrough and is positioned with the force transfer rod 32 extending therethrough. The board B1 is supported on the ribs 27.

The force applying unit 65 is then mounted in position with the wrench 66 engaged with the threaded end 31. Upon turning of the wrench 66 and moving of the unit 65 downwardly the force applied as indicated by the pointer 67 can be read on the dial 69. The force required to move the board downwardly until it strikes the support plate 26 can be utilized in various ways. The height of the ribs 27 as related to the distance between the ribs 27 is a measure of the force required for a particular deformation. If the ribs 27 are sufficiently high, the board B1 may fail before it touches the plate 27 in which case the force required gives the breaking point of the board B1. By watching the movement of the pointer 67 prior to failure the elastic limit or yield point can also be observed.

If now it is desired to use the tool to test the strength of the tongues of the boards the set up in FIG. 5 will be employed.

The holding screws 21 and 22 are threaded in the openings 19 and 20 and a shortened force transfer rod 32 is disconnected from the opening 30 and its threaded end 31 engaged in the opening 49.

Two short lengths of boards B2 can be cut to remove their grooved longitudinal edges and are placed with their normally upper faces on the face 16 and with the ribs 50 separating the two boards B2 and engaging their tongues. The abutment bar 45 is moved by the screw 43 to hold the boards B2 and force applying element 48 snugly.

The abutment arms 35 and 39 are clamped by their adjusting screws 21 and 22 also to hold the boards B2 snugly.

The force applying unit 65 is engaged with the threaded end 33 of the force transfer rod 32 and tightened. As the force is increased the values of the yield point and rupture of the tongues of the boards B2 can be read at the dial 69.

If now it is desired to determine the holding force of a clip C the force transfer rod 32 and force applying element 48 as used in the tests related to FIG. 5 are removed and the clip holding element 55 and its force transfer rod 59 are employed.

A short length of board B3 is inserted with its tongue adjacent the sidewall 14 and the clip-holding element 55 with a clip C therein loosely engaged therewith. A second length of board B3 is placed parallel thereto.

The abutment arms 35 and 39 are moved by their screws 21 and 22 to hold the boards B3 against upward displacement and the abutment bar 45 moved by the screw 43 to engage the clip C in the edges of the boards B3 in the customary manner.

The force applying unit 65 is then applied to the threaded end 63 of the force transfer rod 59 and the wrench 66 turned to apply a force increased as desired to the clip C. The holding point of the clip in terms of force can be readily recognized and the clip-seating point and tightness of the clip can be measured.

The nature of the failure, after completion of the force application, can be inspected.

It will thus be seen that a testing tool having a wide range of usefulness has been described with which the objects of the invention are attained.

I claim:

1. A testing tool for testing components of wood-flooring systems which comprises;
    a frame having horizontal top and bottom walls with working faces and sidewalls spacing said top and bottom walls,
    a force applying unit above said top wall and having an indicator of the force applied,
    a force transfer member for applying a generally vertical force to the component
    said force transfer member having a portion extending through said top wall and having a threaded force applying portion in engagement with said force applying unit, and
    mounting means in said frame for the component comprising
        holding members extending horizontally from said walls and vertically movably mounted thereon for resisting said vertical force, and a horizontally adjustable flooring component abutment member in said frame and movable on said bottom wall.

2. A testing tool as defined in claim 1 in which
    adjusting members for said holding members are carried by said top wall,
    one of said sidewalls has an adjusting member carried thereby for said horizontally adjustable abutment member and
    said top wall provides an abutment for said force applying unit.

3. A testing tool as defined in claim 1 in which
    said force transfer member includes a rod and has a force applying member carried thereby for engagement with said flooring components.

4. A testing tool as defined in claim 1 in which
    said force transfer member includes a force applying element with ribs for direct engagement with edge portions of floor boards.

5. A testing tool as defined in claim 1 in which
    said force transfer member includes a clip-holding element applying a force on a clip in engagement with wood floor boards.